June 1, 1948. E. O. THEN 2,442,385
CONTAINER HANDLE
Filed Aug. 30, 1944
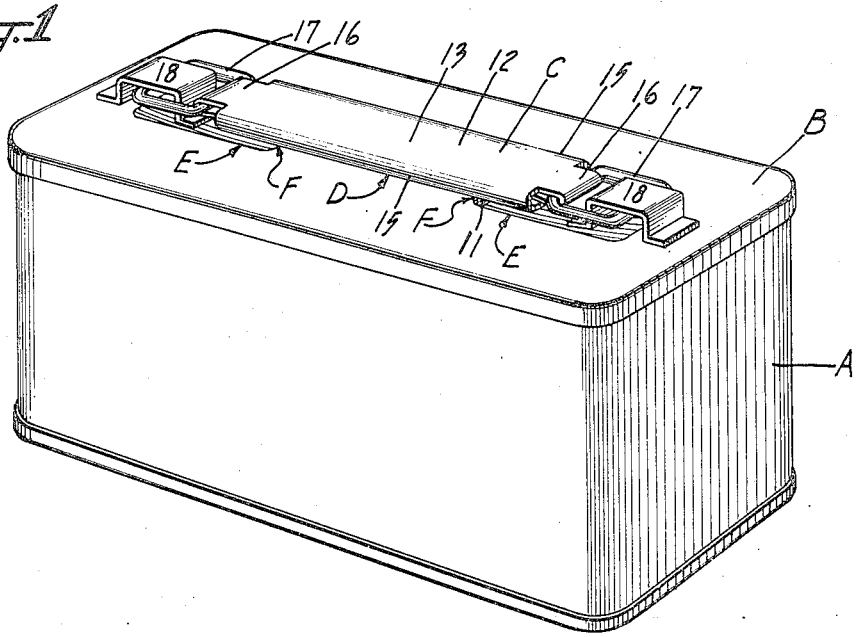
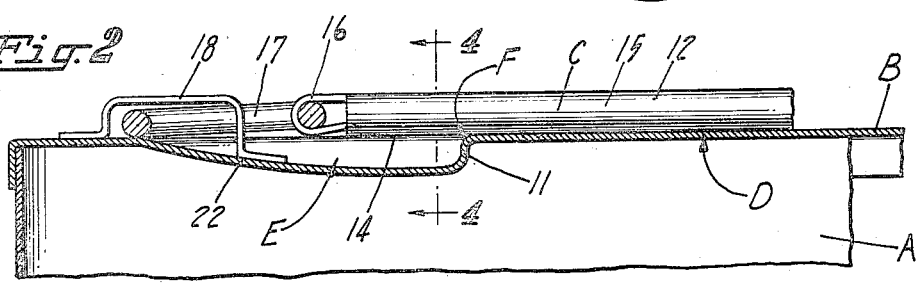
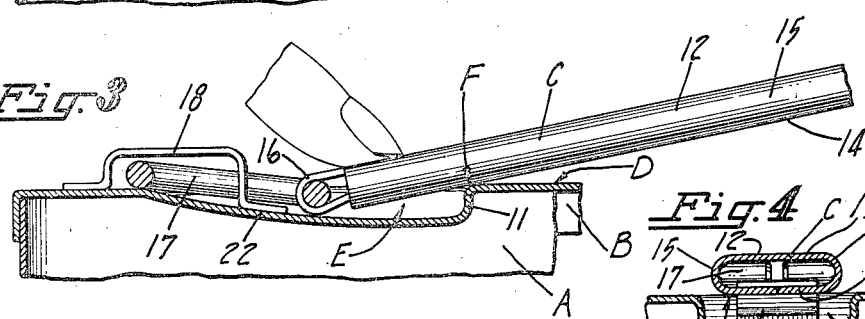
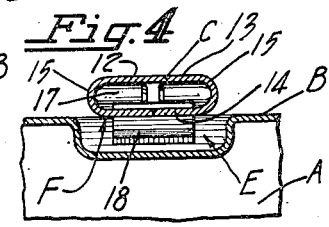
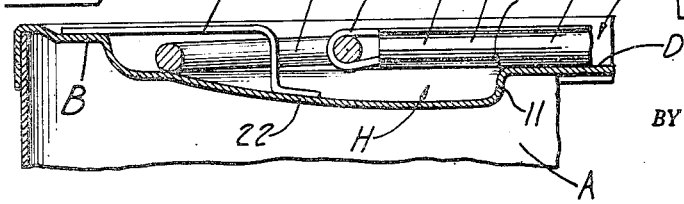
INVENTOR.
Edward O. Then
BY Ivan L. Thornburgh
Charles H. Erne
ATTORNEYS Patented June 1, 1948

2,442,385

UNITED STATES PATENT OFFICE 2,442,385

CONTAINER HANDLE

Edward O. Then, Newark, N. J., assignor to American Can Company, New York, N. Y., a corporation of New Jersey Application August 30, 1944, Serial No. 551,858

3 Claims. (Cl. 220—94)

This invention relates to containers and to attached handles for carrying them and has particular reference to a collapsible carrying handle which is adapted to rest closely against the container wall overlying a recess when in noncarrying position and which may be tilted and grasped readily to bring it into container carrying position by pressing the handle end into the recess.

When collapsible handles are attached to containers for carrying them, they usually are constructed to lie flat against a wall of the container in order to occupy less space and to be out of the way while not being carried. Frequently such handles are disposed in sunken panels or depressions formed in a wall section of the container and thus are located in a more or less protected position inwardly of the main or outer wall of the container. However, such close lying handles and such protected handles sometimes are difficult to grasp, especially during cold weather when such containers must be handled while gloves are being worn.

The instant invention contemplates overcoming this difficulty even in winter when heavy gloves are worn, by providing a simple straight handle for a cooperating container that may be tilted or partially lifted by a slight pressure on one end thereof, thereby pressing such end into a recess formed in the container so that the opposite end will rise sufficiently to permit grasping of the handle which thereupon may be lifted easily into container carrying position.

An object of the invention is the provision of a collapsible carrying handle for a container wherein the handle is formed with a projecting part at one end which is adapted to overlie a recess in the wall of the container while the remainder of the handle is disposed on a handle engaging surface adjacent the recess, whereby pressure applied to the projecting end of the handle to depress the end into the recess, lifts its opposite end clear of the container so that the handle may be grasped readily for bringing it into container carrying position.

Another object is the provision of such a handle for a container having a main body portion engageable when at rest against a surface of a container or on a sunken panel and having a projecting part at an end of the handle adapted to overlie a recess and a fulcrum, the latter being formed by the juncture of the container surface and a wall of the recess, whereby pressure applied to the projecting end of the handle to position the end into the recess tilts it about the fulcrum and thereby lifts the opposite end away from the container surface so that the handle may be grasped readily for bringing it into container carrying position.

Numerous other objects and advantages of the invention will be apparent as it is better understood from the following description, which, taken in connection with the accompanying drawings, discloses a preferred embodiment thereof.

Referring to the drawings:

Figure 1 is a perspective view of a container embodying the present invention and showing a cover in closed position and a carrying handle disposed on a handle engaging surface with projecting ends overlying spaced recesses formed in the cover;

Fig. 2 is an enlarged fragmentary sectional view of the container and cover and illustrating one end of the handle when it is in collapsed position on the cover;

Fig. 3 is a view similar to Fig. 2, showing the handle tilted upwardly by pressure applied at the end thereof;

Fig. 4 is a transverse sectional view of the handle and cover as taken substantially along the line 4—4 in Fig. 2; and Fig. 5 is a view similar to Fig. 2, illustrating a handle of the instant invention disposed on a handle engaging surface of a sunken panel in a modified form of cover.

As a preferred embodiment of the invention the drawings illustrate a rectangular shaped sheet metal container A which is adapted for use as a lunch kit, tool box, ammunition container or the like. The container is fitted with a cover B which may be connected by hinges to a side wall of the container but which for the purpose of this invention need not be shown. A collapsible handle C is provided for carrying the container. The drawing shows the main body of the handle located on a handle engaging surface D of the container which in the present instance comprises the outside top wall of the cover. It is against this surface that the handle is disposed when not in use. The projecting ends of the handle C are shown herein overlying spaced recesses E formed in the cover B.

The handle C (Fig. 2) also overlies a fulcrum F which is formed at the juncture of the handle engaging surface D and a depending wall H of the recess E. It is about this fulcrum that the handle C is rocked while being tilted into container carrying position (see also Fig. 3). There are two such fulcrums in each cover, one at the inner end of each spaced recess. This provides for a construction wherein the handle may be tilted at either projecting end.

The handle C preferably is made from one piece of sheet metal and comprises a tubular body or hand grip 12 of oval conformation, having a flat top section 13 and a flat bottom section 14. These flat sections are joined by semi-circular sections 15 at the sides (Fig. 4). This type handle permits the bottom section 14 to lie flat against the cover surface D when not in use and at the same time provides an easy carrying handle designed to fit the hand when such a handle is in container carrying position.

At each opposite end, the flat top section 13 of the handle terminates in a loop 16, the free ends of which are engaged in the hollow section of the hand grip. Each loop 16 provides a pivotal seat for a loosely fitting rectangular shaped link 17. Each link connects into an elongated eyelet clip 18. These eyelet clips may be secured to the container in any suitable manner, such as by welding of their engaging ends. The drawing shows one engaging end of each clip secured to the top wall of the container cover B while the other engaging end is disposed in its associated recess E, where it is secured to a bottom wall 22 of the recess.

The elongated clips 18 permit the links 17 to move into the outer ends of the recesses E when the handle is in its collapsed position against the cover. The handle thus is flat (Fig. 2) in collapsed position. The links 17 slide forward toward the inner ends of the clips when the handle is in raised carrying position. In such a position it is spaced from the outside top wall of the cover.

When an ordinary handle of this general construction is in a collapsed position flat against the outside wall of the container, it is difficult to pick up, especially when gloves are worn. The handle and container of the instant invention is easily raised, it being necessary merely to press down against either one of the projecting ends of the handle, as best illustrated in Fig. 3. Such a downward pressure rocks the handle about the adjacent fulcrum F and depresses the engaged end into the recess E. The fulcrum action lifts the opposite end of the handle clear of the container wall and into a position where the fingers may be inserted readily between the handle and the container. With this combination of projecting handle end and associated cover recess, the handle may be gripped and brought into carrying position with one motion. In fact, in this construction the entire operation may be performed easily with one hand.

According to the present invention it is not necessary for the handle in its collapsed position to be above the top surface of the container cover. Figure 5 illustrates a handle C located in a sunken panel G formed in the cover so that the handle when not in use will be out of the way and will be protected. The projecting ends of the handle C in this variation overlie spaced recesses H which are similar to recesses E but which extend deeper in the wall. The eyelet clips need only slight alteration so that a substantially flush top construction is provided when the handle is disposed in the sunken panel. This is shown as clips 25. The action of pressing one end and lifting of the other end of the handle is the same only in this case the rising end of the handle moves out of the sunken panel in coming into the raised position above the top of the cover.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. The combination of a container having a handle engaging surface in a wall thereof and a recess disposed in said wall, a depending wall of said recess at its juncture with said container wall constituting a fulcrum, and a collapsible substantially rigid carrying handle attached at its opposite ends to said container wall in a loose floating connection, the body portion of said handle being substantially flat and normally resting closely against said container wall surface, an end portion of said handle overlying said recess and said fulcrum in spaced relation to the bottom of the recess and being of less dimension than said recess, whereby depression of said handle end into said recess tilts the handle on the adjacent recess fulcrum wall to lift the opposite handle end away from the container surface so that the handle may be readily grasped for bringing it into container carrying position.

2. The combination of a container having a handle normally engageable with a wall thereof and having spaced recesses formed in said wall, a collapsible substantially rigid carrying handle attached to the container wall in a sliding connection, said handle when collapsed being adapted to closely engage the wall in non-carrying position, said handle comprising a one-piece sheet metal hollow sheet metal hand grip member having an oval shaped main body portion terminating in looped portions at its opposite ends, and a pair of link members respectively engaging at one of their ends with said looped portions and at their opposite ends with said sliding connection with the container wall for hingedly connecting the handle to the container, the opposite ends of said handle including said looped portions respectively overlying and projecting over said spaced recesses, whereby pressure applied to either end of said handle adjacent one of the link members tilts the handle end into a said recess and lifts the opposite end of the handle away from the container wall so that the handle may be readily grasped for bringing it into container carrying position.

3. The combination of a container having a sunken panel wall defining a handle engaging surface in the top wall of the container and having spaced recesses formed in said panel wall, a collapsible substantially rigid carrying handle attached to the container and normally resting closely against said panel wall when not in use and spaced outwardly therefrom when the handle is in carrying position, said handle having a main body portion normally engaging against said panel wall and a pair of link members hingedly attaching the opposite ends of said handle to a pair of oppositely disposed eyelet clip members secured to said container top wall adjacent said recesses, the opposite ends of said handle and link members extending beyond the inner ends of and overlying the spaced recesses in said panel wall, whereby inward pressure applied to either end of said handle adjacent one of the link members depresses the handle end into the recess therebeneath to tilt the handle on the recess wall as a fulcrum to lift the opposite end of the handle away from said sunken panel wall so that said handle may be readily grasped for bringing the same into container carrying position.

EDWARD O. THEN.

REFERENCES CITED

The following references are of record in the file of this patent:

UNITED STATES PATENTS

| Number | Name | Date |
|---|---|---|
| D. 113,421 | Gough | Feb. 21, 1939 |
| 670,492 | Gould | Mar. 26, 1901 |
| 1,257,385 | Paroly | Feb. 26, 1918 |
| 1,495,752 | La Rue | May 27, 1924 |
| 2,195,028 | Finkelstein | Mar. 26, 1940 |
| 2,277,739 | Worthington | Mar. 31, 1942 |
| 2,337,561 | Lofgren | Dec. 28, 1943 |

FOREIGN PATENTS

| Number | Country | Date |
|---|---|---|
| 317,775 | Great Britain | Aug. 22, 1929 |